(12) United States Patent
Roy

(10) Patent No.: US 6,831,899 B1
(45) Date of Patent: Dec. 14, 2004

(54) VOICE AND VIDEO/IMAGE CONFERENCING SERVICES OVER THE IP NETWORK WITH ASYNCHRONOUS TRANSMISSION OF AUDIO AND VIDEO/IMAGES INTEGRATING LOOSELY COUPLED DEVICES IN THE HOME NETWORK

(75) Inventor: Radhika R. Roy, Howell, NJ (US)

(73) Assignee: AT&T Corp., New York, NY (US)

( * ) Notice: Subject to any disclaimer, the term of this patent is extended or adjusted under 35 U.S.C. 154(b) by 849 days.

(21) Appl. No.: 09/640,681

(22) Filed: Aug. 18, 2000

(51) Int. Cl.⁷ ............................................. H04L 12/16
(52) U.S. Cl. ....................... 370/260; 370/401; 370/352; 370/463
(58) Field of Search ................................ 370/259, 260, 370/261, 262, 263, 395.21, 395.41, 351, 352, 401, 389, 347, 442, 321, 337, 264, 265, 266, 267, 268, 269, 419, 420, 463; 379/202.01, 203.01, 204.01, 205.01; 348/14.1, 14.08

(56) References Cited

U.S. PATENT DOCUMENTS

| | | | | |
|---|---|---|---|---|
| 5,991,276 A | * | 11/1999 | Yamamoto | 370/260 |
| 6,157,401 A | * | 12/2000 | Wiryaman | 348/14.09 |
| 6,157,635 A | * | 12/2000 | Wang et al. | 370/352 |
| 6,163,531 A | * | 12/2000 | Kumar | 370/260 |
| 6,327,276 B1 | * | 12/2001 | Robert et al. | 370/535 |
| 6,389,502 B1 | * | 5/2002 | Toguchi | 710/314 |
| 6,452,923 B1 | * | 9/2002 | Gerszberg et al. | 370/352 |
| 6,466,252 B1 | * | 10/2002 | Miyazaki | 370/260 |
| 6,584,076 B1 | * | 6/2003 | Aravamudan et al. | 370/260 |
| 6,606,305 B1 | * | 8/2003 | Boyle et al. | 370/260 |
| 6,611,503 B1 | * | 8/2003 | Fitzgerald et al. | 370/260 |
| 6,657,975 B1 | * | 12/2003 | Baxley et al. | 370/260 |
| 6,760,749 B1 | * | 7/2004 | Dunlap et al. | 709/204 |
| 2001/0002927 A1 | * | 6/2001 | Detampel et al. | 379/202 |
| 2002/0105977 A1 | * | 8/2002 | Masunaga et al. | 370/519 |
| 2002/0110145 A2 | * | 8/2002 | Kato | 370/465 |
| 2004/0003045 A1 | * | 1/2004 | Tucker et al. | 709/205 |

FOREIGN PATENT DOCUMENTS

| | | | | |
|---|---|---|---|---|
| EP | 000917355 A1 | * | 5/1999 | H04N/5/00 |
| JP | 02000092465 A | * | 3/2000 | H04N/7/15 |
| WO | WO 99/16213 | * | 4/1999 | H04L/12/28 |

OTHER PUBLICATIONS

Thompson, David. "IEEE 1394: Changing the Way We Do Multimedia Communications", IEEE, vol. 7, Issue: 2, Apr.–Jun. 2000, pp. 94–100.*

* cited by examiner

*Primary Examiner*—Frank Duong
*Assistant Examiner*—Michael J. Moore

(57) ABSTRACT

The present invention provides a method and audio-video conferencing system for efficiently utilizing a Home Network system with a controller and having home audio and video devices coupled by IEEE 1394 standard compliant connections in one of: point-to-point and multipoint arrangement. The method includes the steps of: issuing, by a Residential Gateway, an IEEE-1394 frame consisting of synchronous and asynchronous time slots; handling, by the controller, where home device/devices fail to be sending signaling/data in any asynchronous time slots successfully, traffic of synchronous home devices until the traffic is complete and returning to having the Residential Gateway issue an IEEE-1394 frame consisting of synchronous and asynchronous time slots; handling, by the controller, where a home device is sending signaling/data in an asynchronous time slot and where audio-video conferencing fails to be requested, the traffic of the asynchronous home device/devices until the traffic is complete and returning to having the Residential Gateway issue an IEEE-1394 frame consisting of synchronous and asynchronous time slots; and allocating, by the controller, an asynchronous channel and home devices for, registering details of, and setting up an audio-video conferencing session, where a home device is sending signaling/data in an asynchronous time slot and where audio-video conferencing has been requested.

13 Claims, 8 Drawing Sheets

AAVS=ASYNCHRONOUS AudioVideo SIGNALLING
RTP=REAL-TIME PROTOCOL
UDP=USER DATAGRAM PROTOCOL
TCP=TRANSMISSION CONTROL PROTOCOL

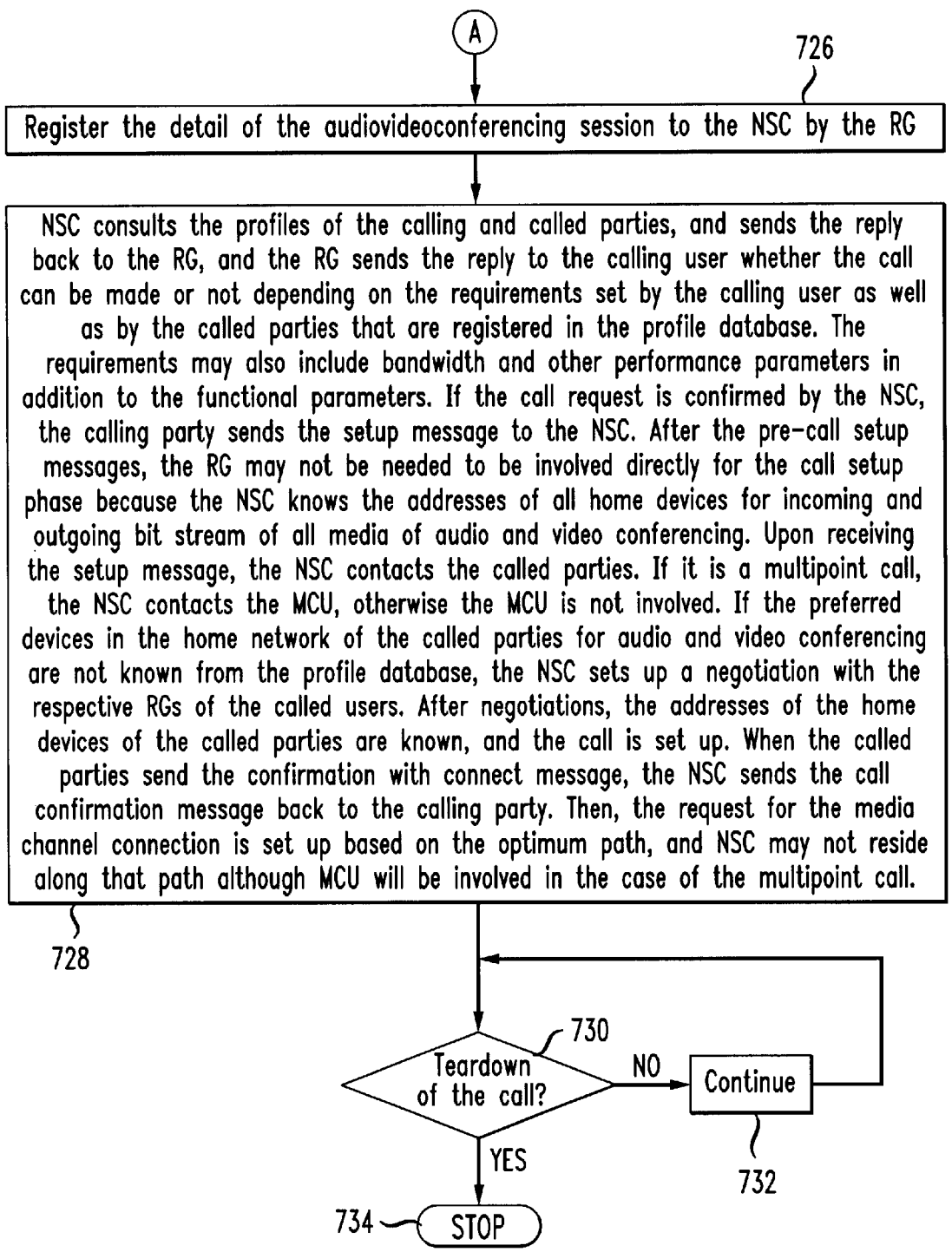

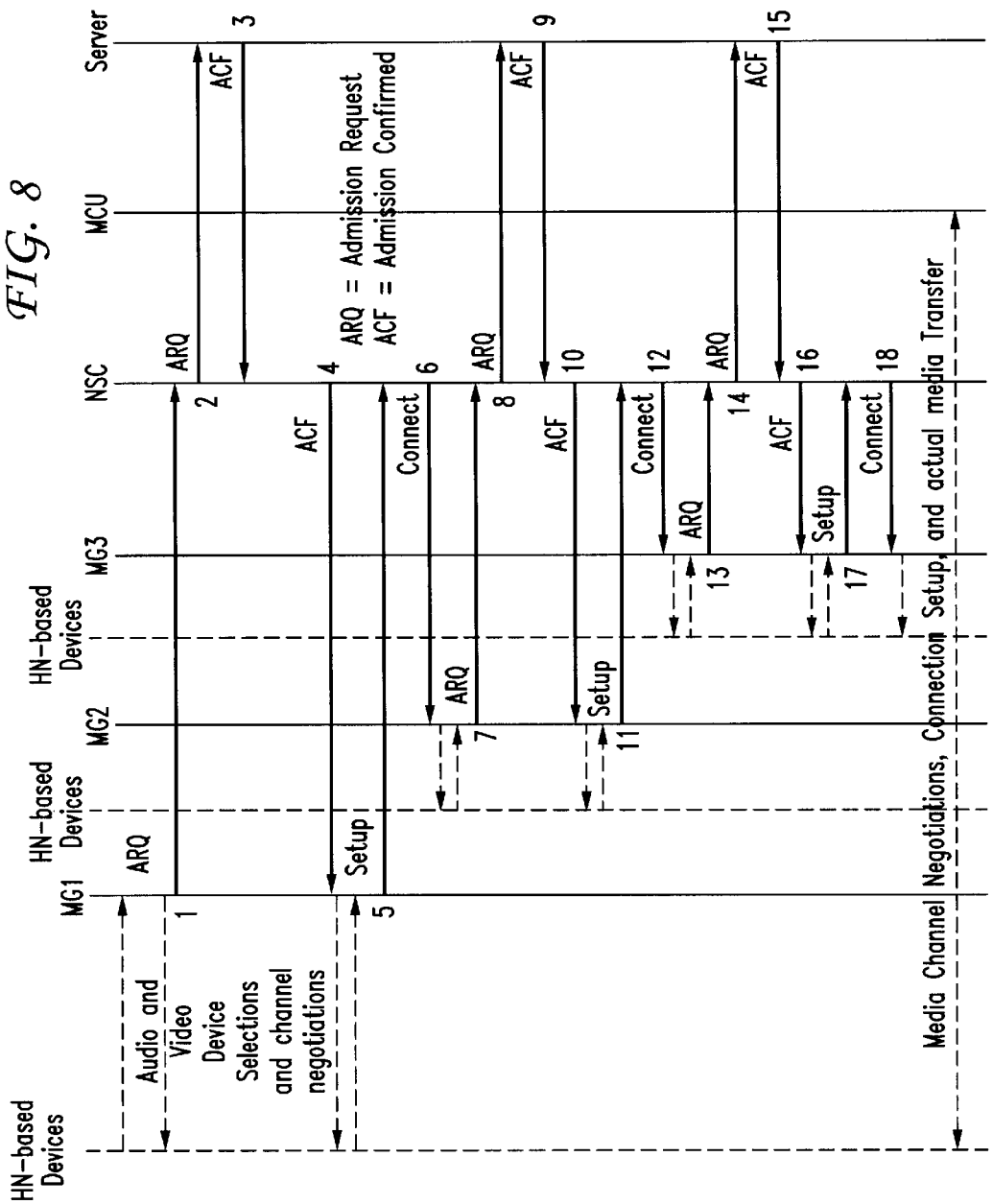

VOICE AND VIDEO/IMAGE CONFERENCING SERVICES OVER THE IP NETWORK WITH ASYNCHRONOUS TRANSMISSION OF AUDIO AND VIDEO/ IMAGES INTEGRATING LOOSELY COUPLED DEVICES IN THE HOME NETWORK

FIELD OF THE INVENTION

The present invention relates generally to audio and video conferencing services, and more particularly to coupling home/small business network-based devices using Internet Protocol (IP) techniques to provide audio and/or video conferencing services using a wide area network-based intelligent service controller.

BACKGROUND OF THE INVENTION

Numerous home/small business network-based devices are available. For example, an IP telephone, a personal computer, a digital camera, a digital videodisc (DVD), a television, and the like. Audio and video may be managed by such devices in many ways and may be used for video conferencing. However, the IP network, especially, the public Internet is lossy and does not provide any guarantee of delay and delay jitter. The IP network also provides no cost-effective, scalable mechanisms that will guarantee the quality of audio and video over the IP network, especially in the wide-area networking environment since it is very difficult to meet the stringent inter-media synchronization requirements between audio and video in the IP/Internet. Thus, when a plurality of home network devices are coupled, the resulting home networking system may be lossy, may not provide a guarantee of delay and delay jitter, may not be cost-effective, may have varying quality of audio and/or video due to scalability problems, and may not meet inter-media synchronization requirements between audio and video in the IP/Internet. Generally, audio and still images are not readily shared within the home networking system.

There is a need for a home networking system that integrates a plurality of home/small business devices for audio and video to provide efficient audio and video conferencing services that includes asynchronous transfer of audio and still images.

SUMMARY OF THE INVENTION

The present invention provides a method and audio-video conferencing system for efficient audio-video conferencing utilizing a Home Network system with a controller and having home audio and video devices coupled by IEEE 1394 standard compliant connections in one of: point-to-point and multipoint arrangement. The method includes the steps of: issuing, by a Residential Gateway, an IEEE-1394 frame consisting of synchronous and asynchronous time slots; determining, by the controller of the Home Network, whether any home device is sending signaling/data in any asynchronous time slots successfully; where no signaling/data is being sent, sending, by the controller, the traffic of the synchronous devices to indicated destinations; determining, by the controller whether the handling of traffic is complete; where handling of traffic is incomplete, returning, by the controller, to handling the traffic of synchronous devices to indicated destinations; where handling of traffic is complete, returning, by the controller, to having the Residential Gateway issue an IEEE-1394 frame consisting of synchronous and asynchronous time slots; where a home device is sending signaling/data in an asynchronous time slot, determining, by the controller, whether there is a request for audio-video conferencing; if audio-video conferencing is not being requested, sending, by the controller, the traffic of the asynchronous devices to the indicated destinations; determining, by the controller, whether traffic handling is complete; where handling of traffic is incomplete, returning, by the controller, to handling the traffic of asynchronous devices to the indicated destinations; where handling of traffic is complete, returning, by the controller, to having the Residential Gateway issue an IEEE-1394 frame consisting of synchronous and asynchronous time slots; where there is a request for audio-video conferencing, allocating, by the controller, an asynchronous channel to the device user and setting up an audio-video conferencing session with the Home Network device user to determine which device is to be used for incoming and outgoing bit streams/channels of each medium in accordance with a predetermined scheme; registering, by the controller, details of the audio-video conferencing session to the network service controller (NSC) by the Residential Gateway; and setting up, by the controller, the audio-video conferencing session/call. Setting up, by the controller the audio-video conferencing session generally includes the steps of: consulting, by the controller, profiles of a calling party and called parties in a profile database; sending a reply back to the Residential Gateway; sending, by the Residential Gateway, the reply to a calling user indicating whether the session/call may be made or not depending on requirements set by the calling user as well as by the called parties registered in the profile database; if a call request is confirmed by the controller, sending, by the calling party, a setup message to the controller; upon receiving the setup message, contacting, by the controller, the called parties, and where the call/session is multipoint, contacting, by the controller, a multipoint controller; if preferred home devices in the Home Network of the called parties for audio and video conferencing are not known from the profile database, setting up, by the controller, a negotiation with respective Residential Gateways of the called parties to obtain addresses of the home devices; using, by the controller, addresses of the home devices of the called parties to set up the session/call; sending confirmation by the called parties with a connect message; sending, by the controller, a call confirmation message back to the calling party; setting up, by the controller, a request for a media channel connection based on an optimum path.. Requirements typically include performance parameters such as bandwidth.

The method may also be described as a method for integrating a plurality of home/small business devices for audio and video to provide efficient audio and video conferencing that includes asynchronous transfer of audio and video images wherein a Residential Gateway/Gateways coupled to a Home Network that is coupled to the home/small business devices and a controller coupled to an access/wide-area network that is coupled to the residential gateway/gateways work cooperatively to assure that the plurality of home/small business devices operate as if a single virtual integrated device is being used to set up audio-video conferencing. In this embodiment, the method includes the steps of sending, by a first residential gateway 1 (RG1), an Admission Request signal to the controller; forwarding, by the controller, the first Admission Request signal to the Server; sending, by the Server, a first Admission Confirmed signal to the controller; forwarding the first Admission Confirmed signal to the RG1; sending, by the RG1 a first Setup signal to the controller; sending, by the controller, a first Connect signal to a second residential gateway RG2; sending, by the RG2, a second Admission Request signal to the controller; forwarding, by the controller, the second Admission Request signal to the Server; sending, by the Server, a second Admission Confirmed signal to the controller; forwarding, by the controller, the second Admission Confirmed signal to the RG2; sending, by the RG2, a second Setup signal to the controller; sending, by the controller, a second Connect signal to a third residential gateway RG3; sending, by the RG3, the second Connect signal to the controller; sending, by the controller, the second Connect signal to the RG3; sending, by the RG3, a third Admission Request signal to the controller; forwarding, by the controller, the third Admission Request to the Server; sending, by the Server, a third Admission Confirmed signal to the controller; forwarding, by the controller, the third Admission Confirmed signal to the RG3; sending, by the RG3, a third Setup signal, to the controller; sending, by the controller, a third Connect signal to the RG3 prior to media channel negotiations, connection setup and actual media transfer.

In another embodiment, the method of the present invention may be described as a method for efficient audio-video conferencing utilizing a Home Network system with a controller and having home audio and video devices coupled by IEEE 1394 standard compliant connections in one of: point-to-point and multipoint arrangement. In this embodiment, the method includes the steps of: issuing, by a Residential Gateway, an IEEE-1394 frame consisting of synchronous and asynchronous time slots; handling, by the controller, where home device/devices fail to be sending signaling/data in any asynchronous time slots successfully, traffic of synchronous home devices until the traffic is complete and returning to having the Residential Gateway issue an IEEE-1394 frame consisting of synchronous and asynchronous time slots; handling, by the controller, where a home device is sending signaling/data in an asynchronous time slot and where audio-video conferencing fails to be requested, the traffic of the asynchronous home device/devices until the traffic is complete and returning to having the Residential Gateway issue an IEEE-1394 frame consisting of synchronous and asynchronous time slots; and allocating, by the controller, an asynchronous channel and home devices for, registering details of, and setting up an audio-video conferencing session, where a home device is sending signaling/data in an asynchronous time slot and where audio-video conferencing has been requested. Setting up, by the controller, may be accomplished as described above.

The present invention provides an audio-video conferencing system for efficient audio-video conferencing utilizing a Home Network system with a controller and having home audio and video devices coupled by IEEE 1394 standard compliant connections in one of: point-to-point and multipoint arrangement. The conferencing system includes: a Residential Gateway which is coupled to the Home Network system with home devices, and is used for issuing an IEEE-1394 frame consisting of synchronous and asynchronous time slots; and the controller which is coupled to an access/wide-area network and the Residential Gateway and is used for: determining whether any home device is sending signaling/data in any asynchronous time slots successfully; where no signaling/data is being sent, sending, by the controller, the traffic of the synchronous devices to indicated destinations; determining whether the handling of traffic is complete; where handling of traffic is incomplete, returning to handling the traffic of synchronous devices to indicated destinations; where handling of traffic is complete, returning to having the Residential Gateway issue an IEEE-1394 frame consisting of synchronous and asynchronous time slots; where a home device is sending signaling/data in an asynchronous time slot, determining whether there is a request for audio-video conferencing; if audio-video conferencing is not being requested, sending the traffic of the asynchronous devices to the indicated destinations; determining whether traffic handling is complete; where handling of traffic is incomplete, returning to handling the traffic of asynchronous devices to the indicated destinations; where handling of traffic is complete, returning, to having the Residential Gateway issue an IEEE-1394 frame consisting of synchronous and asynchronous time slots; where there is a request for audio-video conferencing, allocating an asynchronous channel to the device user and setting up an audio-video conferencing session with the Home Network device user to determine which device is to be used for incoming and outgoing bit streams/channels of each medium in accordance with a predetermined scheme; registering details of the audio-video conferencing session to the NSC by the Residential Gateway; and setting up the audio-video conferencing session/call. The controller sets up the audio-video conferencing session as described above. The requirements include performance parameters such as bandwidth.

An audio-video conferencing system in accordance with the present invention may also be described as an audio-video conferencing system for integrating a plurality of home/small business devices for audio and video to provide efficient audio and video conferencing that includes asynchronous transfer of audio and video images wherein a Residential Gateway/Gateways coupled to a Home Network that is coupled to the home/small business devices and a controller coupled to an access/wide-area network that is coupled to the residential gateway/gateways work cooperatively to assure that the plurality of home/small business devices operate as if a single virtual integrated device is being used to set up audio-video conferencing. The audio-video conferencing system includes: at least a first residential gateway (RG1), a second residential gateway (RG2), and a third residential gateway (RG3), each coupled/arranged to transceive signals with a plurality of Home Network-based audio devices and video devices and with the controller, for sending an Admission Request signal to the controller; the controller, arranged to transceive signals with at least the RG1, a second residential gateway RG2, a third residentialgatewayRG3, and a Server for forwarding the first Admission Request signal to the Server; the Server, arranged to transceive signals with the controller, for sending a first Admission Confirmed signal to the controller; wherein the controller forwards the first Admission Confirmed signal to the RG1 ;the RG1 sends a first Setup signal to the controller; the controller sends a first Connect signal to the RG2; the RG2 sends a second Admission Request signal to the controller; the controller forwards the second Admission Request signal to the Server; the Server sends a second Admission Confirmed signal to the controller; the controller forwards the second Admission Confirmed signal to the RG2; the RG2 sends a second Setup signal to the controller; the controller sends a second Connect signal to the RG3; the RG3 sends the second Connect signal to the controller; the controller sends the second Connect signal to the RG3; the RG3 sends a third Admission Request signal to the controller; the controller forwards the third Admission Request to the Server; the Server sends a third Admission Confirmed signal to the controller; the controller forwards the third Admission Confirmed signal to the RG3; the RG3 sends a third Setup signal, to the controller; and the controller sends a third Connect signal to the RG3 prior to media channel negotiations, connection setup and actual media transfer.

In another embodiment, the audio-video conferencing system of the present invention may be described as an audio-video conferencing system for efficient audio-video conferencing utilizing a Home Network system with home devices, where the conferencing system has a controller and home audio and video devices that are coupled by IEEE 1394 standard compliant connections in one of: point-to-point and multipoint arrangement. The audio-video system includes: a Residential Gateway arranged to transceive signals with the Home Network System, home devices and an access/wide-area network with a controller, for issuing, an IEEE-1394 frame consisting of synchronous and asynchronous time slots; the controller, arranged to transceive signals with the access/wide-area network, for: where home device/devices fail to be sending signaling/data in any asynchronous time slots successfully, traffic of synchronous home devices until the traffic is complete and returning to having the Residential Gateway issue an IEEE-1394 frame consisting of synchronous and asynchronous time slots; handling, where a home device is sending signaling/data in an asynchronous time slot and where audio-video conferencing fails to be requested, the traffic of the asynchronous home device/devices until the traffic is complete and returning to having the Residential Gateway issue an IEEE-1394 frame consisting of synchronous and asynchronous time slots; and allocating an asynchronous channel and home devices for, registering details of, and setting up an audio-video conferencing session, where a home device is sending signaling/data in an asynchronous time slot and where audio-video conferencing has been requested. The controller sets up the audio-video conferencing session as described above.

BRIEF DESCRIPTION OF THE DRAWINGS

FIG. 8 shows a call flow diagram for audio and video conferencing for multipoint communications in accordance with the present invention.

DETAILED DESCRIPTION OF PREFERRED EMBODIMENTS

Figure 1:
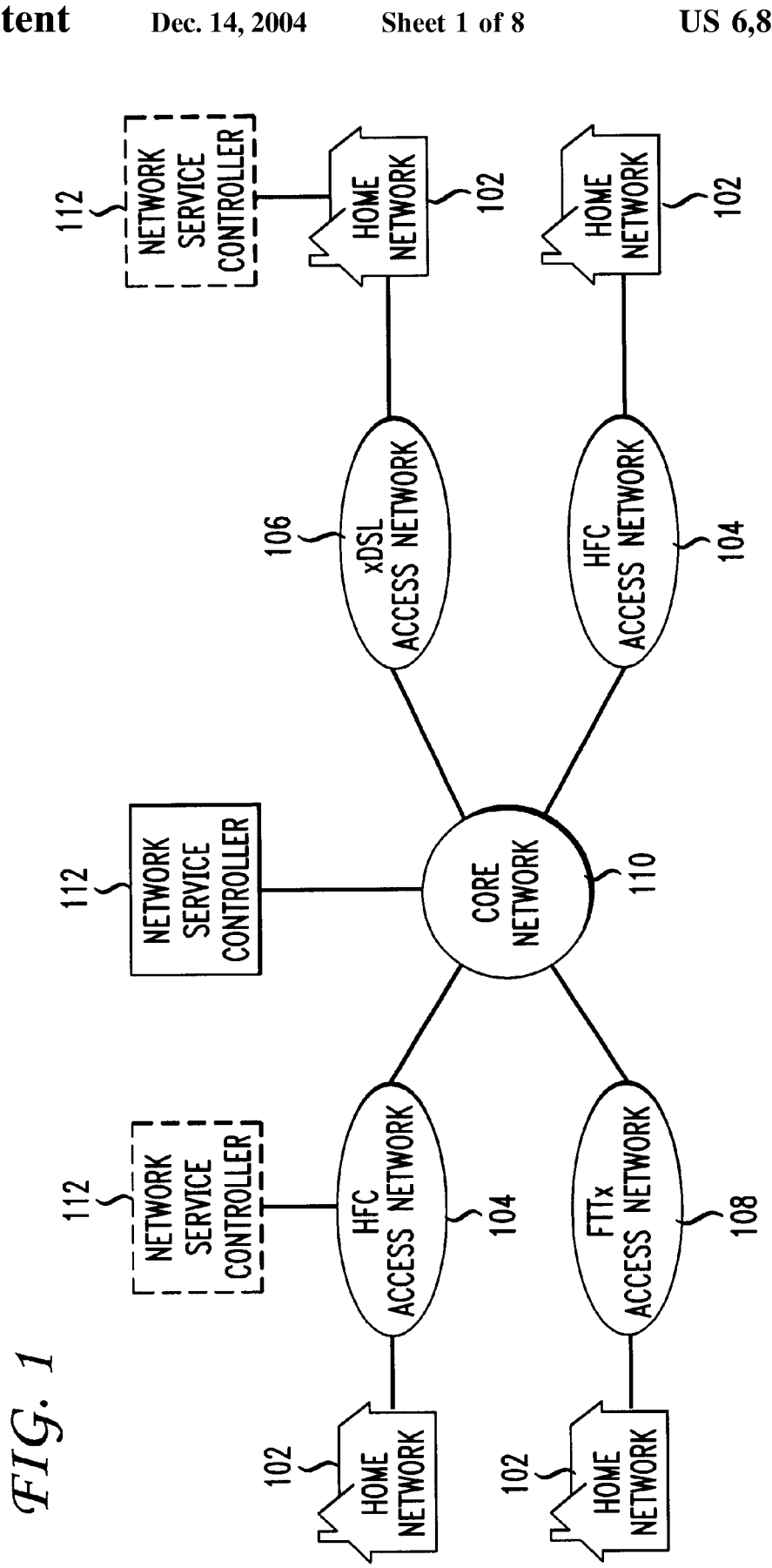
FIG. 1 is a block diagram showing one embodiment of an overall high level end-to-end network architecture for supporting the residential services in accordance with the present invention.

The present invention integrates audio and video conferencing services by integrating users' loosely coupled home network-based devices, operating to provide network-based cost-effective voice over IP (VoIP) services that include still images, to provide integration of the user's home network capabilities with the carrier's network to provide services related to network-based services related to audio and video conferencing, and to provide flexible use of the user's home network devices.

Services may include providing video or still images without lip-synchronization for both point-to-point and multipoint communication and may include asynchronous transfer or audio and still images of the speakers over the IP network. The video or still images of the conferees are de-coupled from the transmission of audio within the home network, freeing the home network devices to be a part of audio and video conferencing in addition to laying a role in home entertainment and relieving the IP network from meeting the stringent requirements for inter-media synchronization. The end-user may also have the capability of displaying conference participants' images in a same audio and video device or alternatively, in two devices, one for audio and one for video.

From a service aspect, the present invention may be utilized to provide multimedia conferencing using devices in the home/small business network. In the home network (HN), a digital camera, a digital audio device, and a personal computer may operate independently since such devices may be used individually at different times for different purposes. For example, the digital camera may be used for taking pictures, and the pictures may be stored directly into the digital video disk (DVD). However, the same digital camera may be used for transmitting pictures of conference participants while audio communication is occurring. Thus, the HN provides flexibility to use the same device for different purposes.

A HN may be used for audio and video conferencing over the public Internet and/or IP network. The lack of Quality of Service (QoS) support for inter- or intra-media jitter, as well as packet losses, may hamper complete synchronization between the audio and video on the HN, especially over the public Internet. Since audio is typically the primary concern in conferencing, the lack of complete video synchronization may be tolerated by users in a HN system. Such flexibility may allow bandwidth-intensive images of the conference participants to be sent asynchronously if the users are willing to accept lack of lip-synchronization. The asynchronous transmission without complete video synchronization also allows the HN system to operate without having to be subject to QoS requirements, allowing the HN system to operate using less bandwidth.

Thus, the HN system enables the designer to provide less dedicated audio and video circuitry for conferencing, while allowing conference participants to see one another either without complete lip-synchronization or alternatively, by simply viewing still images of the conference participants. The audio device and video camera of the HN system may operate independently, or may be arranged to operate in conjunction with one another. Where the audio device and video camera operate independently, the images may be displayed on the personal computer or television within the HN as necessary. The personal computer may also be used for data applications.

For multipoint communications, in the present invention a network-based multipoint controller unit (MCU) may be used to provide intelligent bridging for audio, images and/or data.

As shown in FIG. 1, the present invention may be utilized in an overall high level end-to-end network architecture for supporting the residential services. The architecture includes four major architectural components: the Home Network (HN) 102, an Access Network 104 (e.g., a hybrid-fiber-coaxial cable (HFC)), a Digital Subscriber Loop (xDSL) 106, a Fiber-To-The selected intermediate position 108 (i.e., FTTX), Core Network 110 (e.g., public Internet), and Network Service Controller (NSC) 112. The HN interconnects the customer premises devices within the home and is connected to the Access Network. The Access Network may consist of hybrid-fiber-coaxial cable, asynchronous-digital subscriber loop (ADSL), digital subscriber loop (DSL), fiber-to-the-curb (FTTC), or fiber-to-the home (FTTH). The different access technologies provide flexibility for different residential environments. A Core Network may be the public Internet that uses the Internet Protocol. The NSC (e.g., MCU) provides the intelligence in the Core, Access, and/or Home Network.

Figure 2:
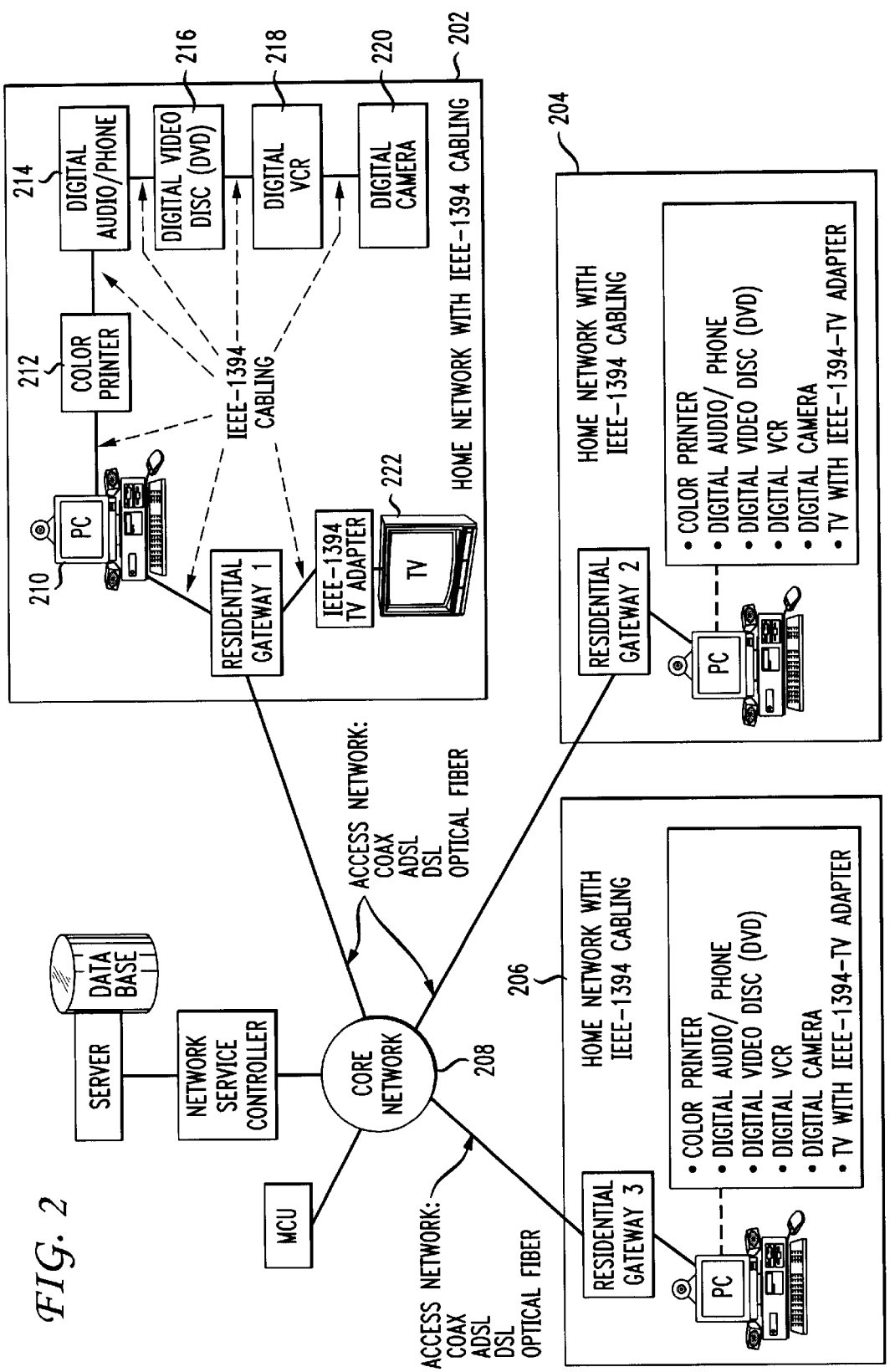
FIG. 2 is a block diagram showing one embodiment of a Home Network Architecture with an end-to-end network configuration having IEEE-1394 cabling in accordance with the present invention.

As shown in FIG. 2, in one embodiment the present invention provides a Home Network Architecture with an end-to-end network configuration having IEEE-1394 cabling 202 that is typically coupled to the other networks via an Access Network such as hybrid coaxial cable, an ADSL, a DSL, or Optical Fiber, which is coupled to the Core Network 208. The home network generally interconnects various devices within the customer premises such as personal computers (PCs) 210, printers 212, digital audio/phone devices 214, digital video disks (DVDs) 216, digital video cassette recorders (VCRs) 218, digital cameras 220, television/televisions (TVs) 222 with IEEE 1394 adaptors, and other devices. The IEEE 1394 is named "FireWire®" in part because of its high throughput speed and may be used to daisy-chain the various devices in the home network. In addition, specific software capabilities may be included to facilitate auto-installation of devices in the home network system.

Figure 3:
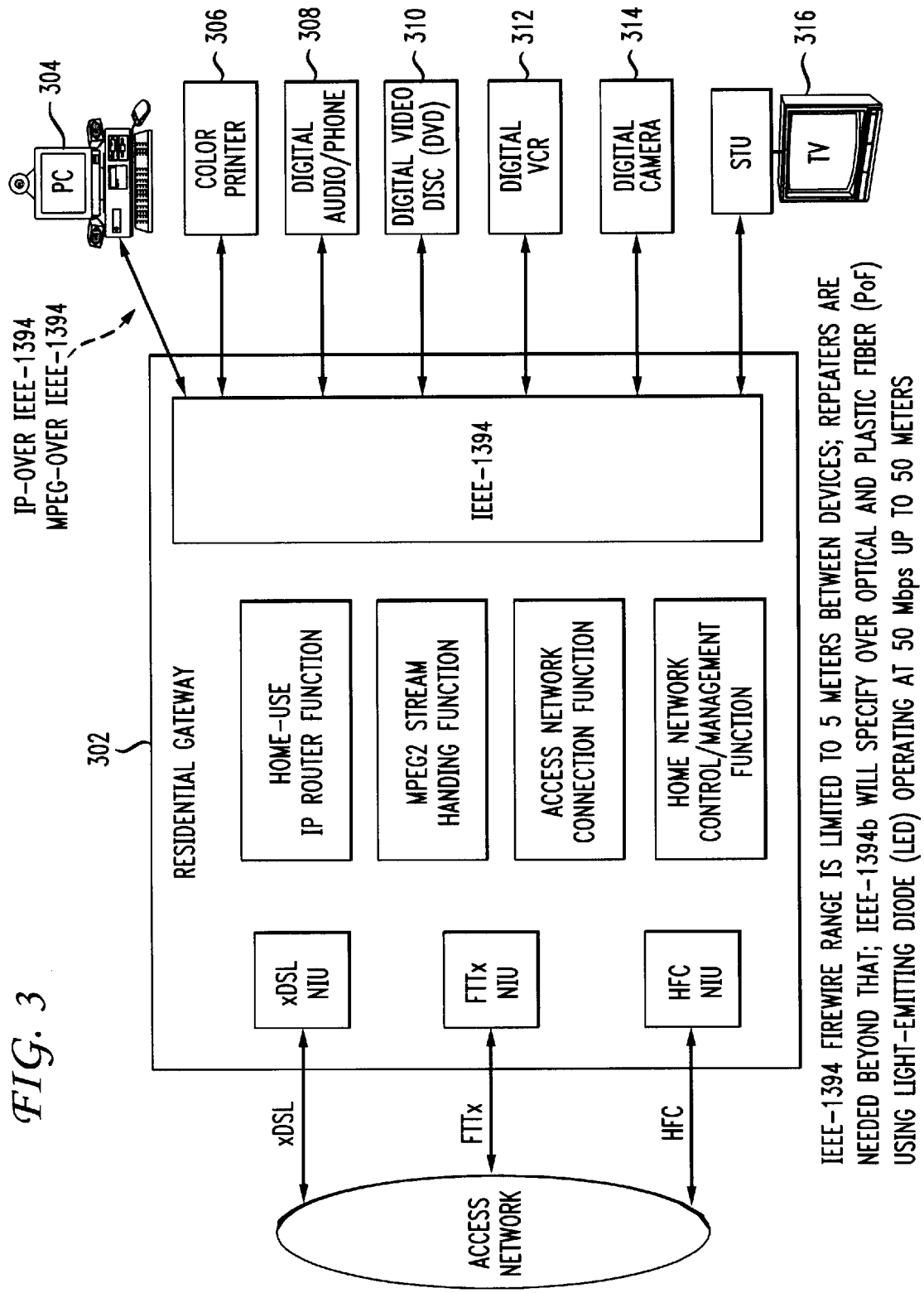
FIG. 3 is a block diagram of one embodiment of a Residential Gateway (RG) and its components that may be utilized in the present invention.

FIG. 3 shows more clearly one embodiment of a Residential Gateway (RG) 302 and its components that may be utilized in the present invention. Both FIGS. 2 and 3 illustrate the home devices such as PCs, TVs, printers, digital audio devices, VCRs, and DVDs. In FIG. 2, the devices are daisy-chained, wherein FIG. 3, device 304, 306, 308, 310, 312, 314 and 316 are connected in point-to-point fashion. Regardless of whether the devices are connected in point-to-point or daisy-chain configurations, the traffic maybe moved between the devices as if they are connected in a point-to-point fashion. For example, traffic may be moved between the PC and the DVD to show DVD images on the PC monitor. A connection may be established between the PC and the DVD, and traffic flows between the two devices transparently (as shown in FIG. 2), even though a color printer and a digital audio box are between them. The job of the connection node is accomplished by the root node, a required element of the architecture that has a global view of all communications within the Home Network. The root node may be located in any device in the Home network; in the example shown in FIG. 3, the root node is embedded in the RG.

Most devices in the Home Network have two ports to support the daisy chain. The PC, for example, has a wired connection to the RG and another to the color printer. Some devices, such as the digital camera, have only one port, and thus must be at the end of the daisy chain. It is also possible to have multiple daisy chains from the root node and to have traffic between them. In FIG. 2, a second daisy chain from the RG includes a TV. Even though the Home Network is physically composed of multiple daisy chains, the connection may logically be viewed as a single bus.

The IEEE-1394 (FireWire®) standard defines a standard for a High Performance Serial Bus and sets forth a serial data transfer protocol and inexpensive interconnection system that provides the same services as standard parallel buses. Use of FireWire® connections is intended in part to simplify home wiring for consumer electronics. Instead of a spaghetti array of wires in the back of stereo sets, VCRs, and TVs, a single cable is used for connecting audio and video devices and signal routing. Connections may be in a bus, star or daisy-chain topology. Improved video pictures such as high definition television (HDTV) and audio may be provided using this technology. Digital video camcorders with IEEE-1394 connectivity were made publicly available in 1995 and 1996.

The IEEE 1394 High Performance Serial Bus may be utilized with a Universal Serial Bus (USB) to minimize connectivity problems. Though the FireWire® cabling specifies a specific type of cabling, work is underway to adapt FireWire® to other physical infrastructures, such as twisted-pair wiring, plastic-optical-fiber (PoF), and single-mode fiber. The speed may vary from 98.304 Mbps to 400 Mpbps.

Looking at FIG. 3, the elements of FireWire®'s RG are shown. The home-use IP router function defines the address translation of IP to and from FireWire®, which can have its own numbering pan. For example, the MPEG-2 stream handling function is concerned with MPEG interaction with FireWire® to bind the IEEE- 1394 channel to an MPEG PID or IP address. That is, this function maps MPEG programs to FireWire® to FireWire® channels. Similarly, applications in the PC, digital audio devices, digital video from digital video cameras, DVDs and printers have their own addresses mapped to FireWire® channels.

The access network connection function interacts with the access network functions such as auto-configuration, packet filtering, and authentication. The control and management function is concerned with connection to carrier management systems, such as fault monitoring, invoicing, and software updates. Modular interfaces may be used for interfacing the various devices with the access network. Plug-in cards, such as PC cards, may be used to alter connectivity features, although fixed configurations may be less costly.

The IEEE-1394 standard allows for 16-bit addressing and up to 64K nodes in a system. Up to 16 cable hops may be used between nodes, so that the number of branches is limited. The IEEE-1394 standard also sets forth two bus categories: backplane and cable. The backplane bus supplements parallel bus structures by providing an alternative serial communication path between devices plugged into the backplane. The cable bus is a non-cyclic network with finite branches. That is, the cable bus includes bus bridges and nodes (cable devices). The term "non-cyclic", as used herein, means that devices are not connected together into loops. A bus bridge may connect similar or different types of buses. For example, an IEEE-1394-to-PCI interface within a PC is a bus bridge, which may function as the root node device and provide a controller for the bus. A bus bridge also may be used to interconnect an IEEE-1394 cable bus and an IEEE-1394 backplane bus. Where six-bit Node_Ids are used, up to 63 nodes may be connected to one bus bridge. 10 bit Bus_Ids may be used to connect up to 1,023 bridges in a system. Thus, a typical IEEE-1394 adapter card in a PC may have 63 devices connected to it.

In general, each node has three connectors, although the IEEE-1394 standard allows one to 27 connectors for a device's physical layer. The IEEE-1394 system is generally somewhat limited by the physical layer. In general, up to 16 nodes may be daisy-chained through the connectors with standard cables up to 4.5 meters in length for a total standard cable length of 72 meters. More devices may be connected using a leaf-node configuration. Physical addresses are assigned when the bus is reset, the system is powered up or down, and whenever a node is added or removed from the system, either by physical connection/disconnection: The system does not use device ID switches. Nodes are generally hot-plugged together, such that the bus is a plug-and-play bus.

DAVIC (Digital Audio Visual Council), ITU (International Telecommunications Union) and IETF (Internet Engineering Task Force) are defining standards for the software adaptation of IP, audio, video, data, MPEG and other applications over FireWire®. The software standard specifies a protocol stack encompassing address, timing, bandwidth reservation and media access control. Each FireWire®-compliant device contains a configuration read-only memory (ROM) that is embedded in digital set top boxes (STBs), NICs, and consumer electronic (CE) devices. This ROM contains the equivalent of an Ethernet MAC address, the speed requirement of the device, and the information on whether it operates on asynchronous or synchronous mode. It is the configuration of ROM that provides the plug-and-play capability of FireWire®. The user plugs in the FireWire® connector, and the device is fully capable of participating in the local network.

When a device is attached to the network and the power is turned on, an event called the bus reset occurs. In the bus reset, each device broadcasts the contents of its configuration ROM. The root node listens to all traffic, distills it, and develops the topology. After the bus reset, the root has a global picture of what devices are attached to the network, their speed requirements, their requirements for isochronous support, and their identifiers.

Figure 4:
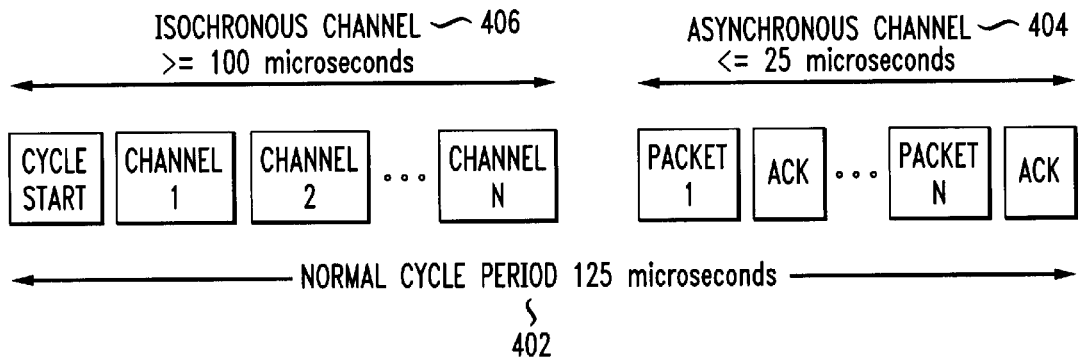
FIG. 4 shows a frame format for FireWire® which may be utilized in accordance with the present invention.

FIG. 4 shows a frame format for FireWire® which may be utilized in accordance with the present invention. Every 125 microseconds 402, the root node issues a frame consisting of two time slots for isochronous access and a slot for contention-based access, or asynchronous access. At least 20 percent of the frame (25 microseconds) 404 is saved for terminals wanting asynchronous access. The remainder 406 of the time slot is placed into time slots for use by isochronous users. Terminal equipment desiring an isochronous channel bids for time slots, which subsequently are granted or denied by the root node.

Individual stations send and receive on virtual channels labeled with an 8-bit channel identifier. Up to 63 isochronous devices may be attached. The channel identifier is assigned by the root node and is used by the terminal until the next bus is reset. An important function of the RG in the IEEE-1394 FireWire® model is to bind the IEEE-1394 channel identifier to an application (e.g., MPEG PID) or TCP/UDP/IP address (e.g., Data TCP/IP address, Audio RTP/UDP/IP address, Video RTP/UDP/IP address).

FireWire® represents a very high-end Home Network architecture that is particularly well-suited for video transmission, including broadcast TV. However, its range is limited to 5 meters between devices; repeaters are required beyond that. An updated standard, called IEEE-1394b, specifies FireWire® over optical and plastic fiber, and the range problem is solved. However, this requires a change in house wiring; otherwise FireWire® cable will be left dangling, as is currently the case for the consumer equipment and PC wiring.

The IEEE-1394 system provides for flexible bus management with connectivity between many devices, and does not need to include a PC or other bus controller. Bus management typically includes: for isochronous operation, a cycle controller that broadcasts cycle start packets, an isochronous resource manager to support isochronous communication, and may include a bus controller.

When the bus is reset, the configuration of the bus is determined, addresses are assigned to each node, and arbitration for the cycle controller, the isochronous resource manager, and the bus controller takes place. The IEEE-1394 bus provides guaranteed bandwidth and latency that is needed for high-speed data transfer over multiple channels. The isochronous resource manager includes information such as the remaining bandwidth available to all isochronous nodes. On bus reset or when an isochronous node is added to the bus, the node requests a bandwidth allocation. Where enough bandwidth is not available, the requesting device is expected to repeat its request periodically.

The isochronous resource manager assigns a channel number to nodes that request isochronous bandwidth based on predetermined values. Channel numbers are used to identify the isochronous packets. When a node no longer requires isochronous resources, the node releases its bandwidth and channel number. Device control is typically accomplished by asynchronous communication. Thus, video communication requires only a single isochronous channel plus an asynchronous path for device control.

In accordance with the present invention, loosely coupled home devices may be used for audio and video conferencing without using any special videoconferencing equipment as it is used today. PCs, digital cameras, TVs, phones, and other devices may be used independently for audio and video conferencing. Table 1, shown below, shows some examples of how these devices may play roles for audio and video conferencing.

TABLE 1

| Medium | Channel or Bit Stream | Home Network Devices | Remarks |
| --- | --- | --- | --- |
| Audio | Incoming | PC, Phone, TV | Audio is played after decompression by the decoder |
| | Outgoing | PC, Phone | Audio is compressed in the encoder |
| Video | Incoming | PC, TV, digital camera equipped with an encoder | Video is displayed after decompression in the decoder |
| | Outgoing | Digital Camera/PC | Video stream coming from the digital camera is compressed by the encoder within the PC |
| Data | Incoming | PC | |
| | Outgoing | PC | |

A TV may operate in its simplest receive only mode where both audio and video may be decompressed by the respective decoders (audio/video) while a PC may operate in full-duplex (send/receive) mode for data. An interactive TV may have the capability for two-way communications. For audio, a PC may act in full-duplex mode where encoder and decoder of audio may be present simultaneously. Similarly, a PC may also be equipped with video encoder and decoder.

In one embodiment, a user has a stored image in the DVD, and the user sends the stored image from the DVD as the only picture while the audio conferencing is taking place. In another embodiment, a user may transfer a selected stored images from the DVD after a certain duration while the conference is taking place. In both embodiments, a digital camera is not needed.

A digital camera that is used for home entertainment may be used in conjunction with the PC that may have an encoder to compress the video bit stream coming from the digital camera. The compressed video bit stream may then be sent to the outside network (access/wide area) from the PC via the RG. In another embodiment, a digital camera may also be equipped with a video encoder to provide compression for the outgoing digital video bit stream.

Where the audio and video streams are transferred over the Internet, it is generally very difficult to obtain proper intra- and inter-media synchronization of the real-time audio and video because of jitter and other performance problems that are caused within the IP/Internet. Video is usually a bandwidth intensive medium, and where the proper inter-media synchronization needs to be maintained for audio and video conferencing, it may not be advantageous to tie video transmission tightly with audio transmission.

In a conferencing scenario, if the video is completely dropped, the conferees will miss images completely. However, if images are sent independently, decoupling the video images from audio transmission, users will receive each other's images, though lip-synchronization may or may not be present. Moreover, the different home network devices may be used flexibly for audio and video conferencing. In this embodiment, audio and video may be considered as two independent applications without being tightly coupled as present videoconferencing application must be. In this asynchronous mode of communications, the devices of the home network may be used independently to serve the basic purpose of audio and video conferencing.

There are many options of audio and video applications in the home devices if audio and video operate independently. One option is to use the PC/TV for receiving video bit stream for video and use the telephone for sending and receiving audio, and a digital camera with an encoder or an encoder placed in the PC or TV for sending the compressed video bit stream.

However, there must be coordination from the signaling point of view when both audio and video are transmitted for audio and video conferencing. That is, an intelligent entity (e.g., service controller, as shown in FIG. 1) must be present that coordinates the loosely coupled home network devices from the conferencing point of view. A conference call may be point-to-point or multipoint. In both embodiments, a call traverses form one Home Network to another Home Network via the Internet or other network. In the case of a multipoint call, as shown in FIG. 2, the call may be bridged (e.g., use of the MCU) to save the bandwidth as well as to provide the bridging function. In particular, video may bridged by switching the video of the speaker only, sending of video that combines picture of all conferees and the like, as desired by the conferees.

For audio, the digital audio bit stream is generally transmitted over the real time protocol (RTP), and the RTP protocol uses the user datagram protocol (UDP). Finally, the UDP messages may be sent over the IP. Similarly, video may also be sent using the RPT/UDP/IP protocol.

An RG may act as a root node that grants or denies the time slot for the audio and video devices of the home network and binds the RTP/UDP/IP address over the IEEE-1394 channel as synchronous time slots. From this channel allocation scheme, the RG may identify that both the audio stream and the video stream that have the particular IP addresses are the same user of the particular Home Network. As shown in Table 1, a use of the Home Network has the flexibility to use many devices for sending and receiving audio and video bit streams.

However, a user may also have the flexibility to choose which device is to be used for each medium for audio and video conferencing, and preferences of each user may be registered in the profile database controlled by the NSC. The profile may contain the addresses of the RG, channels, IP addresses, UDP/TCP ports, RTP profiles, and devices in the Home Network that are to be used for audio and video conferencing. In audio and video conferencing, the device that handles audio (microphone/speaker) becomes the primary device for communications while the device that handles video is the optional one. In the profile, a user indicates which device is to be considered as the primary device for audio. If the speaker and microphone are not connected to the same device, the two separate devices that handle microphone and speaker become the primary devices for two-way communications, although in some circumstances, one-way communications may also be acceptable. All these preferences for each device are recorded in the profile and are then stored in the profile database.

Registration in the profile database may be static or dynamic. In the static mode, the registration may be made at the time of service provisioning. In the dynamic mode, the registration may be made using the signaling protocol. In the present invention, such registration is designated as the asynchronous audio and video signaling (AAVS) protocol. This AAVS protocol is not only used for profile registration during the pre-call setup, it is also used for the call setup and the teardown of the call.

The RG then registers this information with the wide area network-based network service controller (NSC). All RGs register this information with the NSC. This registration of the information by a RG to the NSC is done for both point-to-point and multipoint calls.

In the case of a multipoint call, the NSC works cooperatively with the MCU to provide bridging and multipoint communications services. In the case of a point-to-point call, the NSC may use this information for routing, billing, and other purposes.

Figure 5:
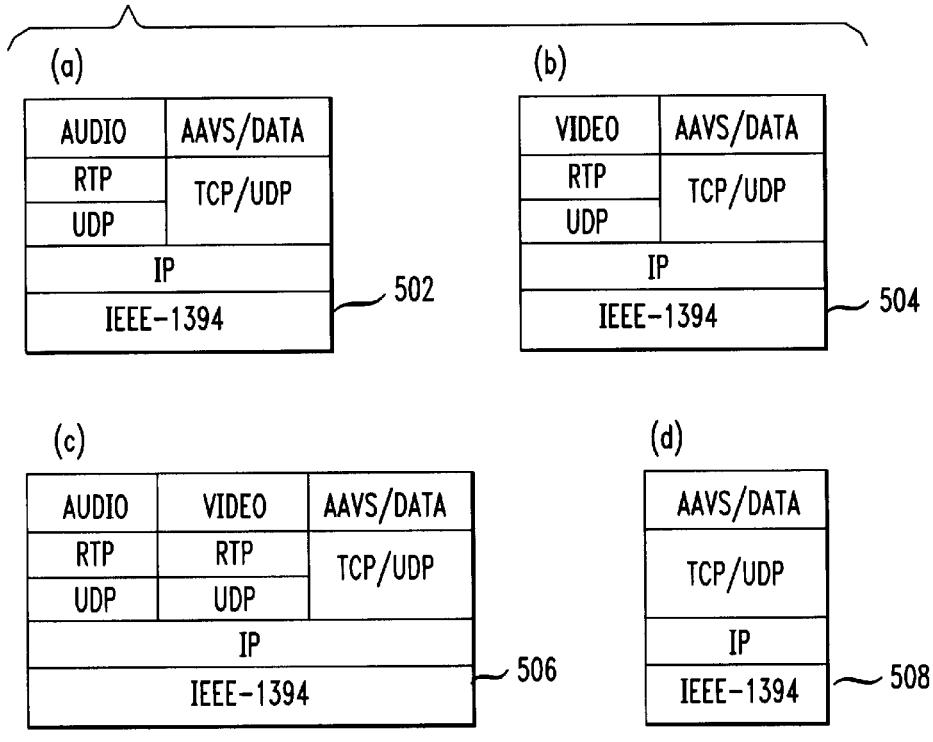
FIG. 5 shows a protocol architecture for the audio, video, data, and signaling application that may be utilized in accordance with the present invention.

FIG. 5 shows a protocol architecture for the audio, video, data, and signaling application that may be utilized in accordance with the present invention. A Home Network-based device may contain only audio, video, and/or data. However, each device will contain the asynchronous audio-video signaling (AAVS) to take part in conferencing in accordance with the present invention. RTP, TCP/UDP, and IP are the protocols defined by the IETF. FireWire® IEEE-1394 has been defined by IEEE. Different protocol stacks for different applications: a 502 is for an audio only device, b 504 is for a video only device, c 506 is for an audio, video, and data device, and d 508 is for a data only device. However, each device has an AAVS signaling protocol to participate in the audio and video conferencing in accordance with the present invention.

TABLE 2

| Example AAVS Signaling Messages | Functions |
| --- | --- |
| ARQ = Admission Request | Home Network Device Type, Protocol Type, Call type (point-to-point, multipoint), 1394-channel addresses, destination address, Quality-of Service parameters (QoS), call reference value, conference ID, call capacity, port and network addresses, etc. |
| ARJ = Admission Reject | If anything that has been requested in ARQ message is not available, this message is sent with the cause for rejection. |
| ACF = Admission Confirmed | Confirm the parameters requested in ARQ message |
| Setup | Home Network Device Channel addresses, port and network addresses for all entities that require addresses, source and destination addressed, Protocol identifier, call type, etc. |
| Connect | Information elements very similar to the setup message elements. For example, Home Network Device Channel addresses, port and network addresses for all entities that require addresses, source and destination addressed, Protocol identifier, call type, etc. |
| Other message sets for negotiation media channels and establish virtual connections | Information elements for negotiation of media channels and virtual connections. |

Figure 6:
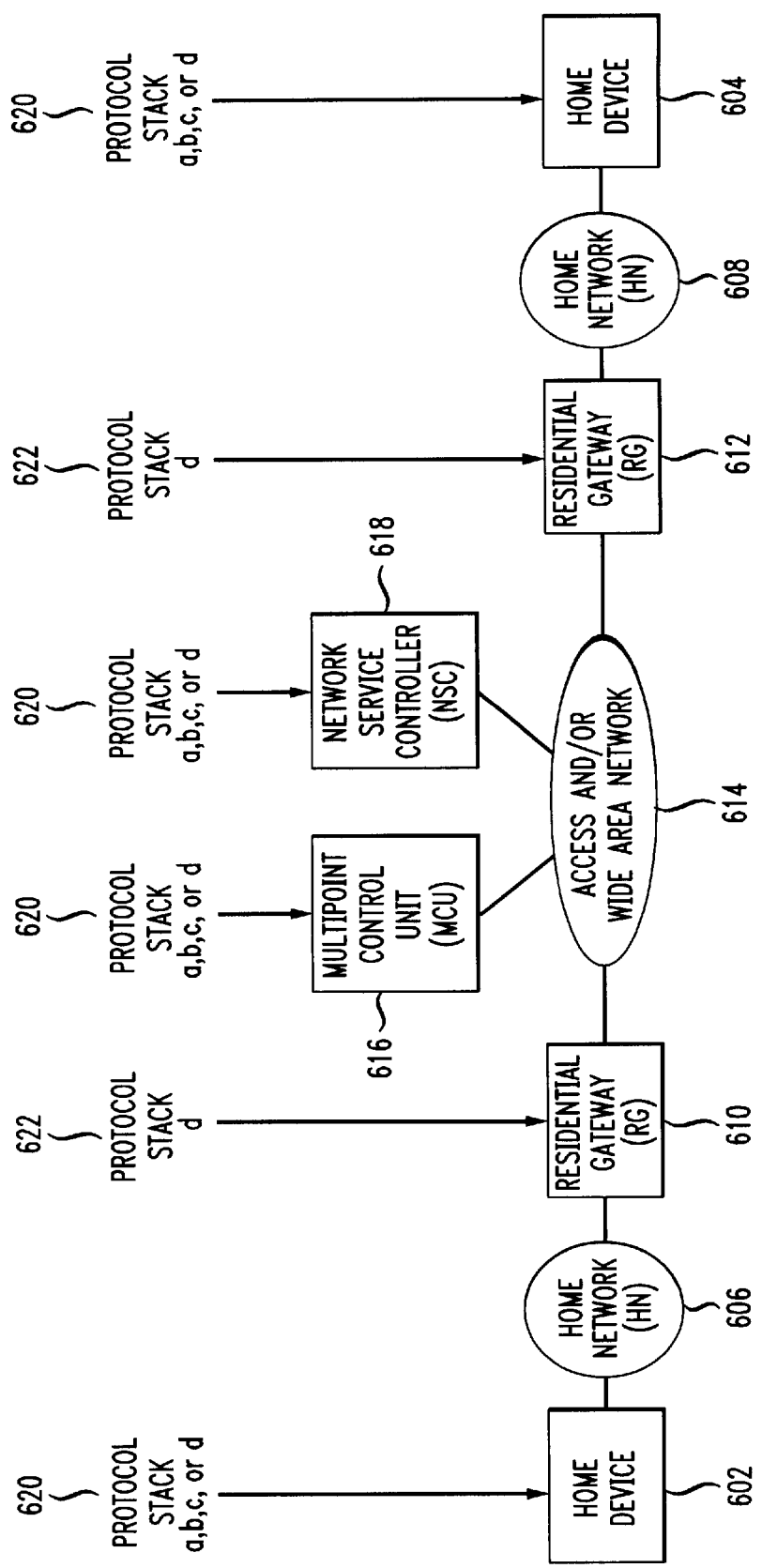
FIG. 6 is a block diagram illustrating an end-to-end configuration and protocol stacks in accordance with the present invention.

FIG. 6 is a block diagram illustrating an end-to-end configuration and protocol stacks in accordance with the present invention. Users' home devices 602, 604 are connected to the Home Network 606, 608 along with a RG 610, 612. The RG 610, 612 connects the Home Network 606, 608 to the access and/or wide area network 614. The multipoint controller (MCU) 616 provides multipoint communications between multiple parties along with media bridging (e.g., bridging for audio, video, and/or data). However, the network control server (NCS) 618 is a signaling entity that facilitates communications to establish the call between the two or multiple parties located in the Home Network in accordance with the present invention.

As shown in FIG. 6, each device may have different protocol stacks: a, b, c, or d 620 for a Home Network-based device 602, 604, MCU 616, and NSC 618, and d 622 for a RG 610, 612. Table 2 (set forth above) shows the AAVS signaling messages that may be used by different devices for audio and video conferencing in accordance with the present invention.

Figure 7:
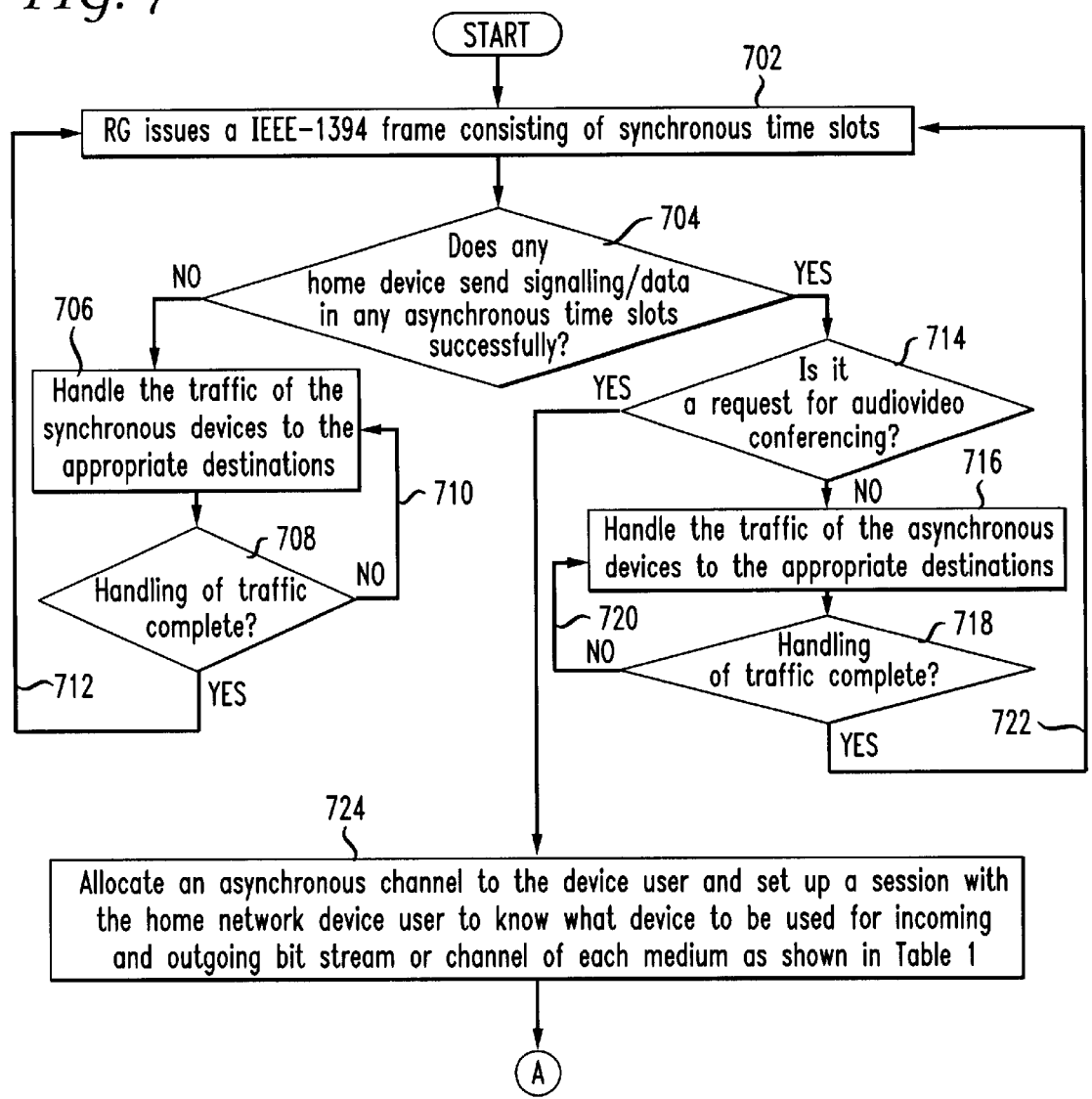
FIG. 7 is a flow chart showing one embodiment of steps in accordance with audio and video conferencing in Home Network-based devices in accordance with the present invention.

FIG. 7 is a flow chart showing one embodiment of steps in accordance with audio and video conferencing in Home Network-based devices in accordance with the present invention. As shown in FIG. 7, first a residential gateway (RG) issues 702 an IEEE-1394 frame consisting of synchronous and asynchronous time slots. Then the residential gateway (RG) determines 704 whether any home device is sending signaling/data in any asynchronous time slots successfully. Where no signaling/data is being sent, the traffic of the synchronous devices is sent 706 to the indicated destinations. The residential gateway (RG) then determines 708 whether the handling of traffic is complete. Where handling of traffic is incomplete, the residential gateway (RG) returns 710 to handling the traffic of synchronous devices to the indicated destinations. Where handling of traffic is complete, the residential gateway (RG) returns 712 to having the RG issue 702 an IEEE-1394 frame consisting of synchronous and asynchronous time slots. Where a home device is sending signaling/data in an asynchronous time slot, the residential gateway (RG) determines 714 whether there is a request for audio-video conferencing. If audio-video conferencing is not being requested, the residential gateway (RG) sends 716 the traffic of the asynchronous devices to the indicated destinations. The residential gateway (RG) then determines 718 whether traffic handling is complete. Where handling of traffic is incomplete, the residential gateway (RG) returns 720 to handling the traffic of asynchronous devices to the indicated destinations. Where handling of traffic is complete, the residential gateway (RG) returns 722 to having the RG issue 702 an IEEE-1394 frame consisting of synchronous and asynchronous time slots. Where there is a request for audio-video conferencing/call, the controller (NSC/MCU) allocates 724 an asynchronous channel to the device user and sets up a session with the Home Network device user to determine which device is to be used for incoming and outgoing bit streams or channels of each medium as set forth in Table 1. The controller (NSC/MCU) then registers 726 the detail of the audio-video conferencing session/call to the NSC by the RG. Then the control unit (NSC/MCU) sets up 728 the audio-video conferencing session/call as follows: The NSC consults the profiles of the calling and called parties, and sends the reply back to the RG, and the RG sends the reply to the calling user indicating whether the call may be made or not depending on the requirements set by the calling user as well as by the called parties that are registered in the profile database. The requirements may also include bandwidth and other performance parameters in addition to the functional parameters. If the call request is confirmed by the NSC, the calling party sends the setup message to the NSC. After the pre-call setup messages, the RG may not be needed to be involved directly for the call setup phase because the NSC has the addresses of all home devices for incoming and outgoing bitstreams of all media of the audio and video conferencing for the Home Network. Upon receiving the setup message, the NSC contacts the called parties. If this is a multipoint call, the NSC contacts the MCU; otherwise the MCU is not involved. If the preferred devices in the Home Network of the called parties for audio and video conferencing are not known from the profile database, the NSC sets up a negotiation with the respective RGs of the called users. After negotiations, the addresses of the home devices of the called parties are known, and the call is set up. When the called parties send the confirmation with a connect message, the NSC sends the call confirmation message back to the calling party. Then, the request for the media channel connection is set up based on the optimum path, and the NSC may not reside along that path, although the MCU will be involved in the case of the multipoint call. After call setup 728, the controller may determine whether the call/session is to be torn down 730, and where the call/session is to be continued, continue 732 until teardown of the call/session is decided 734.

FIG. 8 shows a call flow diagram for audio and video conferencing for multipoint communications in accordance with the present invention. The message flows between the Home Network-based devices and the RG are not shown for simplicity. Also, the signaling messages to set up media channels are also not shown. However, the RGs and NCS work cooperatively to assure that the Home Network-based devices work as if a single virtual integrated device is used to set up the audio-video conferencing. In particular, the Home Network devices send a signal to residential gateway 1 (RG1), which participates with the Home Network-based devices to make audio and video device selections and channel negotiations and sends an Admission Request (ARQ) 2 to the NSC. The ARQ is forwarded to the Server, and an Admission Confirmed (ACF) 3 signal is sent by the Server to the NSC. Then the NSC forwards the ACF signal 4 to the RG1. The RG1 then sends a Setup signal 5 to the NSC, and the NSC sends a Connect signal 6 to the residential gateway 2 (RG2)) The RG2 sends an ARQ signal 7 to the NSC, and the NSC forwards the ARQ signal 8 to the Server. The Server sends an ACF signal 9 to the NSC, which forwards the ACF signal 10 to the RG2. The RG2 sends a Setup signal 11 to the NSC, which sends the Connect signal 12 to the residential gateway 3 (RG3 ). RG3 sends an ARQ signal 13 to the NSC, which is forwarded to the Server 14. The Server sends an ACF signal 15 to the NSC, which forwards the ACF signal 16 to the RG3. The RG3 sends a Setup signal 17 to the NSC and the NSC then sends a Connect signal 18 to the RG3 so that the three conferencing participants RG1, RG2, and RG3 are coupled together. Then media channel negotiations and connection setup and actual media transfer takes place between the MCU and the Home Network-based devices.

As used herein, "home audio and video devices" also include audio and video devices used by small businesses. Audio and video bitstreams are considered as synchronous traffic that has stringent performance requirements (e.g., delay, delay jitter). The data traffic (e.g., AVVS signaling, text graphics, file transfer, etc.) are known as asynchronous traffic.

Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

What is claimed is:

1. A method for efficient audio-video conferencing utilizing a Home Network system with a controller and having home audio and video devices coupled by IEEE 1394 standard compliant connections in one of: point-to-point and multipoint arrangement, comprising the steps of:

issuing, by a Residential Gateway, an IEEE-1394 frame consisting of synchronous and asynchronous time slots;

determining, by the controller, whether a home device is sending signaling/data in an asynchronous time slot successfully;

where signaling/data fails to be sent, sending, by the controller, traffic of synchronous devices to indicated destinations;

determining, by the controller, whether handling of traffic is complete;

where handling of traffic is incomplete, returning, by the controller, to handling the traffic of synchronous devices to indicated destinations;

where handling of traffic is complete, returning, by the controller, to issuing, by the Residential Gateway, the IEEE-1394 frame consisting of synchronous and asynchronous time slots;

where the home device is sending signaling/data in the asynchronous time slot/slots, determining, by the controller, whether there is a request for audio-video conferencing;

if audio-video conferencing fails to be requested, sending, by the controller, traffic of asynchronous devices to indicated destinations;

determining, by the controller, whether traffic handling is complete;

where handling of traffic is incomplete, returning, by the controller, issuing, by the Residential Gateway, the IEEE-1394 frame consisting of synchronous and asynchronous time slots;

where a request for audio-video conferencing is made, allocating, by the controller, an asynchronous channel to a Home Network device user and setting up an audio-video conferencing session/call with the Home Network device user to determine which device is to be used for incoming and outgoing bit streams/channels of each medium in accordance with a predetermined scheme;

registering, by the controller, details of the audio-video conferencing session/call to a network services controller by the Residential Gateway; and setting up, by the controller, the audio-video conferencing session/call.

2. The method of claim 1 wherein setting up, by the controller, the audio-video conferencing session includes the steps of:

consulting, by the controller, profiles of a calling party and called party/parties in a profile database;

sending a reply back to the Residential Gateway;

sending, by the Residential Gateway, the reply to the calling party indicating whether the session/call may be made or not depending on requirements set by the calling party and by the called party/parties registered in the profile database;

if a call request is confirmed by the controller, sending, by the calling party, a setup message to the controller;

upon receiving the setup message, contacting, by the controller, the called party/parties, and where the call/session is multipoint, contacting, by the controller, a multipoint controller;

if preferred home devices in the Home Network of the called party/parties for audio and video conferencing is/are unknown from the profile database, setting up, by the controller, a negotiation with respective Residential Gateways of the called party/parties to obtain addresses of home devices;

using, by the controller, addresses of the home devices of the called parties to set up the session/call;

sending confirmation by the called party/parties with a connect message;

sending, by the controller, a call confirmation message back to the calling party;

setting up, by the controller, a request for a media channel connection based on an optimum path.

3. The method of claim 2 wherein the requirements include performance parameters.

4. The method of claim 3 wherein a performance parameter is bandwidth.

5. A method for efficient audio-video conferencing utilizing a Home Network system coupled to a Residential Gateway that is coupled to an access/wide-area network that has a controller and the Home Network System has home audio devices and home video devices coupled by IEEE 1394 standard compliant connections in one of: point-to-point and multipoint arrangement, comprising the steps of:

issuing, by the Residential Gateway, an IEEE-1394 frame consisting of synchronous and asynchronous time slots;

handling, by the controller, where home device/devices fail to be sending signaling/data in an asynchronous time slot/slots successfully, traffic of synchronous home devices until the traffic is complete and returning to issuing, by the Residential Gateway, the IEEE-1394 frame consisting of synchronous and asynchronous time slots;

handling, by the controller, where a home device/devices is/are sending signaling/data in an asynchronous time slot/slots and where audio-video conferencing fails to be requested, the traffic of the home device/devices until the traffic is complete and returning to issuing, by the Residential Gateway, the-IEEE-1394 frame consisting of synchronous and asynchronous time slots; and allocating, by the controller, an asynchronous channel and home devices for, registering details of, and setting up an audio-video conferencing session/call, where the home device is sending signaling/data in the asynchronous time slot/slots and where audio-video conferencing has been requested.

6. The method of claim 5 wherein setting up, by the controller, the audio-video conferencing session includes the steps of:

consulting, by the controller, profiles of a calling party and called party/parties in a profile database;

sending a reply back to the Residential Gateway;

sending, by the Residential Gateway, the reply to the calling party indicating whether the session/call may be made depending on requirements set by the calling party and by the called party/parties registered in the profile database;

if a call request is confirmed by the controller, sending, by the calling party, a setup message to the controller;

upon receiving the setup message, contacting, by the controller, the called party/parties, and where session/call is multipoint, contacting, by the controller, a multipoint controller;

if preferred home devices in the Home-Network of the called party/parties for audio and video conferencing are unknown from the profile database, setting up, by the controller, a negotiation with respective Residential Gateways of the called party/parties to obtain addresses of home devices;

using, by the controller, addresses of the home devices of the called party/parties to set up the session/call;

sending confirmation by the called party/parties with a connect message; and sending, by the controller, a call confirmation message back to the calling party; and setting up, by the controller, a request for a media channel connection based on an optimum path.

7. An audio-video conferencing system for efficient audio-video conferencing utilizing a Home Network system coupled to a Residential Gateway that is coupled to an access/wide-area network that has a controller and the Home Network system having audio devices and video devices coupled by IEEE 1394 standard compliant connections in one of: point-to-point and multipoint arrangement, comprising:

the Residential Gateway, coupled to the access/wide-area network and the Home Network system with home devices, for issuing an IEEE-1394 frame consisting of synchronous and asynchronous time slots;

the controller, coupled to the access/wide-area network, for:

determining whether a home device is sending signaling/data in asynchronous time slots successfully; where signaling/data fails to be sent, sending, by the controller, traffic of synchronous devices to indicated destinations;

determining whether handling of traffic is complete;

where the handling of traffic is incomplete, returning to handling traffic of synchronous devices to indicated destinations;

where handling of traffic is complete, returning to issuing, by Residential Gateway, the IEEE-1394 frame consisting of synchronous and asynchronous time slots;

where the home device is sending signaling/data in the asynchronous time slot/slots, determining whether a request for audio-video conferencing has been made;

if audio-video conferencing fails to be requested, sending traffic of the asynchronous devices to indicated destinations;

determining whether traffic handling is complete;

where handling of traffic is incomplete, returning to handling the traffic of asynchronous devices to the indicated destinations;

where handling of traffic is complete, returning, to issuing, by the Residential Gateway, the IEEE-1394 frame consisting of synchronous and asynchronous time slots;

where a request for audio-video conferencing is made, allocating an asynchronous channel to a Home Network device user and setting up an audio-video conferencing session/call with the Home Network device user to determine which device is to be used for incoming and outgoing bit streams/channels of each medium in accordance with a predetermined scheme;

registering details of the audio-video conferencing session/call to a network service controller by the Residential Gateway; and setting up the audio-video conferencing session/call.

8. The audio-video conferencing system of claim 7 wherein the controller sets up the audio-video conferencing session/call by:

consulting profiles of a calling party and called party/parties in a profile database;

sending a reply back to the Residential Gateway;

upon sending, by the Residential Gateway, the reply to a calling party indicating whether the session/call may be made depending on requirements set by the calling party and by the called party/parties registered in the profile database, confirming a call request and upon receiving from the calling party, a setup message, contacting the called party/parties, and where the session/call is multipoint, contacting a multipoint controller; and if preferred home devices in the Home Network of the called parties for audio and video conferencing are unknown from the profile database, setting up a negotiation with respective Residential Gateways of the called parties to obtain addresses of the preferred home devices; using addresses of the home devices of the called party/parties to set up the session/call; upon receiving confirmation by the called party/parties with a connect message, sending a call confirmation message back to the calling party; and setting up a request for a media channel connection based on an optimum path.

9. The audio-video conferencing system of claim 8 wherein the requirements include performance parameters.

10. The audio-video conferencing system of claim 9 wherein a performance parameter is bandwidth.

11. An audio-video conferencing-system for efficient audio-video-conferencing utilizing a Home Network system coupled to a Residential Gateway that is coupled to an access/wide-area network that has a controller where the Home Network system has audio devices and video devices coupled by IEEE 1394 standard compliant connections in one of: point-to-point and multipoint arrangement, comprising:

the Residential Gateway, arranged to transceive signals with the Home Network System, home devices and the access/wide-area network with the controller, for issuing, an IEEE-1394 frame consisting of synchronous and asynchronous time slots;

the controller, arranged to transceive signals with the access/wide-are network, for:

where home device/devices fail to be sending signaling/data in an asynchronous time slot/slots successfully, sending traffic of synchronous home devices until the traffic is complete and returning to issuing, by the Residential Gateway, the IEEE-1394 frame consisting of synchronous and asynchronous time slots;

handling, where a home device is sending signaling/data in the asynchronous time slot/slots and where audio-video conferencing fails to be requested, traffic of the asynchronous home device/devices until the traffic is complete and returning to issuing, by the Residential Gateway, the IEEE-1394 frame consisting of synchronous and asynchronous time slots; and allocating an asynchronous channel and home devices for, registering details of, and setting up an audio-video conferencing session, where the home device is sending signaling/data in the asynchronous time slot/slots and where audio-videoconferencing has been requested.

12. The audio-video conferencing system of claim 11 wherein the controller sets up the audio-video conferencing session/call by:

consulting profiles of a calling party and called party/parties in a profile database;

sending a reply back to the Residential Gateway;

when the Residential Gateway sends the reply to a calling party indicating whether the session/call may be made or not depending on requirements set by the calling party as well as by the called party/parties registered in the profile database, confirming a call request and when the calling party sends a setup message to the controller, contacting the called parties, and where the call/session is multipoint, contacting, a multipoint controller; and if preferred home devices in the Home Network of the called parties for audio and video conferencing are unknown from the profile database, setting up a negotiation with respective Residential Gateways of the called party/parties to obtain addresses of home devices; using addresses of the home devices of the called parties to set up the session/call; and upon receiving confirmation by the called party/parties with a connect message, sending a call confirmation message back to the calling party and setting up a request for a media channel connection based on-an optimum path.

13. A method for efficient audio-video conferencing utilizing a Home Network system coupled to a Residential Gateway that is coupled to an access/wide-area network that has a controller and the Home Network system has audio devices and video devices coupled by IEEE 1394 standard compliant connections in one of: point-to-point and multi-point arrangement, comprising the steps of:

where the audio devices and video devices have completed sending signaling/data in a synchronous time slot/slots and asynchronous time slots that are uninvolved in audio-video conferencing:

issuing, by the Residential Gateway, an IEEE-1394 frame consisting of synchronous and asynchronous time slots; and where there is a request for audio-video conferencing, allocating, by the controller, an asynchronous channel to a Home Network device user and setting up an audio-video conferencing session/call with the Home Network device user to determine which audio device/devices and video device/devices are to be used for incoming and outgoing bit streams/channels of each medium in accordance with a predetermined scheme; registering, by the controller, details of the audio-video conferencing session to a network service controller by the Residential Gateway; and setting up, by the controller, the audio-video conferencing session/call.

\* \* \* \* \*